No. 753,622. PATENTED MAR. 1, 1904.
J. P. PERKINS.
ICE CREAM FREEZER.
APPLICATION FILED MAR. 10, 1902.
NO MODEL. 2 SHEETS—SHEET 1.

WITNESSES:
W. L. Bushong
F. E. Bryant

INVENTOR.
Josiah P. Perkins
BY
V. H. Lockwood
ATTORNEY.

No. 753,622. PATENTED MAR. 1, 1904.
J. P. PERKINS.
ICE CREAM FREEZER.
APPLICATION FILED MAR. 10, 1902.
NO MODEL. 2 SHEETS—SHEET 2.
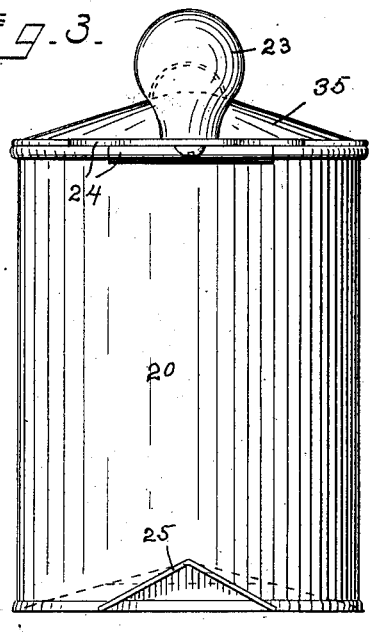
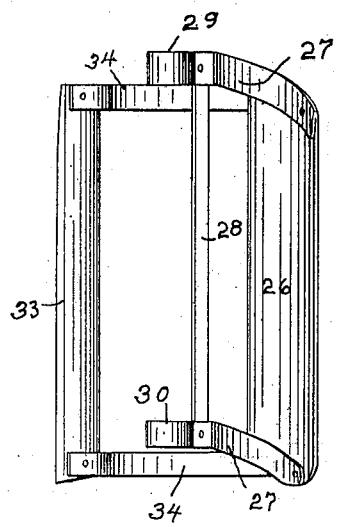
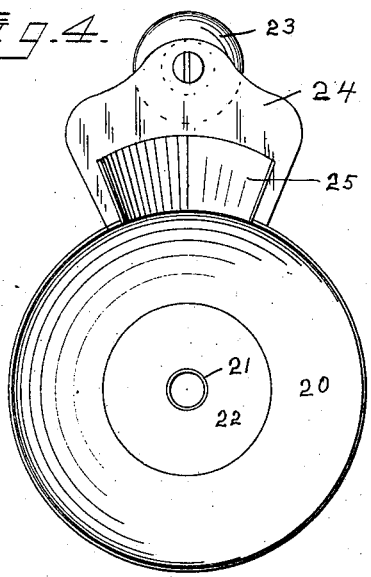
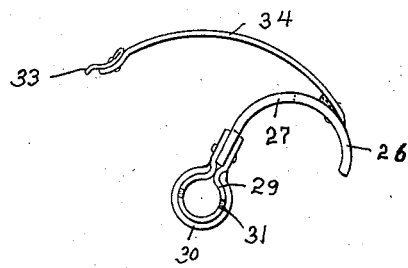
WITNESSES:
W. L. Bushong
F. E. Bryant
INVENTOR.
Josiah P. Perkins
BY
V. H. Lockwood
ATTORNEY.
THE NORRIS PETERS CO., PHOTO-LITHO., WASHINGTON, D. C.

No. 753,622.

Patented March 1, 1904.

UNITED STATES PATENT OFFICE.

JOSIAH P. PERKINS, OF INDIANAPOLIS, INDIANA.

ICE-CREAM FREEZER.

SPECIFICATION forming part of Letters Patent No. 753,622, dated March 1, 1904.

Application filed March 10, 1902. Serial No. 97,514. (No model.)

*To all whom it may concern:*

Be it known that I, JOSIAH P. PERKINS, of Indianapolis, county of Marion, and State of Indiana, have invented a certain new and useful Ice-Cream Freezer; and I do hereby declare that the following is a full, clear, and exact description thereof, reference being had to the accompanying drawings, in which like numerals refer to like parts.

The object of this invention is to improve the construction and operation of ice-cream freezers to increase their efficiency, to reduce the friction of the parts during operation, and to simplify and cheapen the construction.

The nature of the invention will be understood from the accompanying drawings and the following description and claims.

Figure 1:
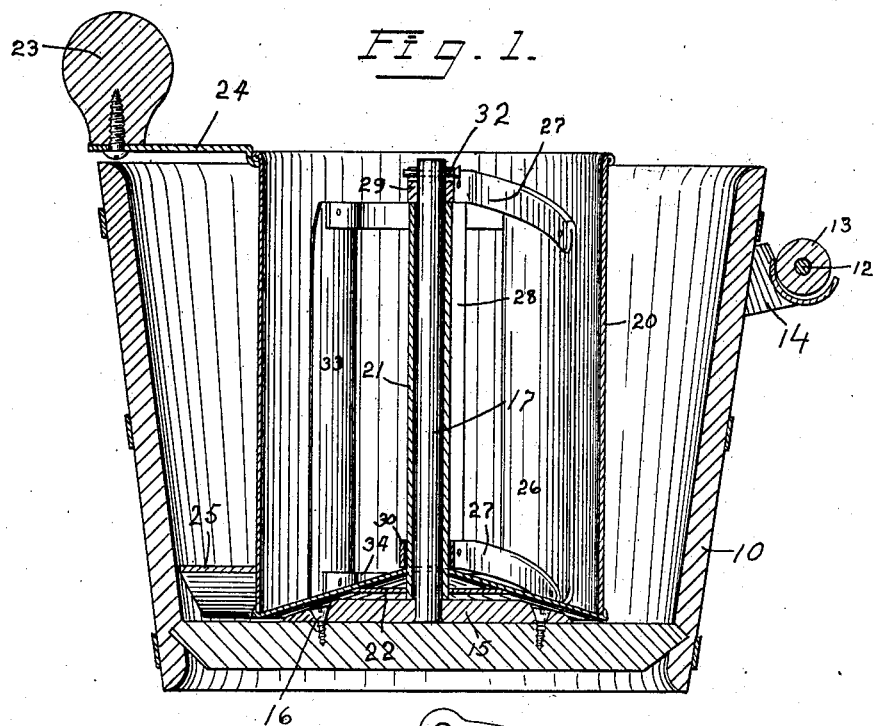
Figure 2:
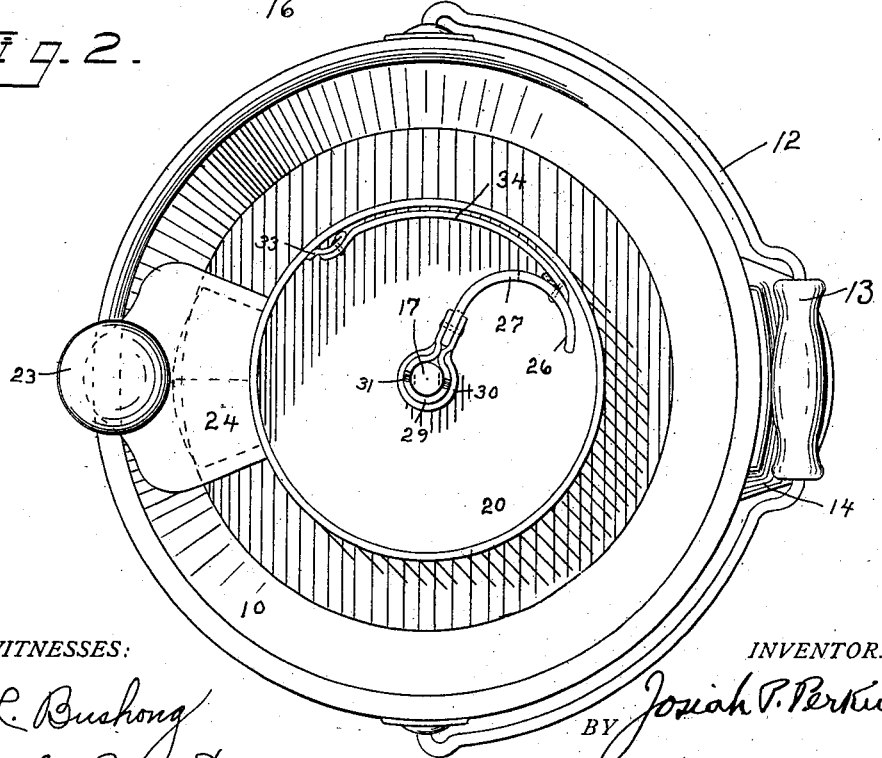

In the drawings, Figure 1 is a central vertical section of the invention with the lid of the cream-can removed. Fig. 2 is a plan view thereof with the lid of the cream-can removed. Fig. 3 is an elevation of the cream-can. Fig. 4 is a bottom view of the same. Fig. 5 is an elevation of the combined worker and scraper. Fig. 6 is a plan view thereof.

The drawings herein show a wooden pail 10 of the ordinary type having a metal bail 12 with a rotary wooden handle 13 thereon. On one side a bracket-shaped handle 14 is secured, that is preferably made of metal, with the outer portion thereof concave on the upper side to receive the wooden handle 13 of the bail and to serve as a support for the same. The lower side of the outer portion of said metal handle 14 is convex, the purpose of this arrangement being not only to furnish a support for the bail-handle, but more especially, in combination with the bail-handle, to form a convenient means for securely holding the wooden vessel in place and steady the same with one hand and while the cream-can is being rotated or handled with the other hand. Such arrangement makes it convenient to hold the wooden bucket down as well as lift it or empty it.

A circular metal plate 15 is centrally secured on the upper side of the bottom of the vessel 10 by means of the screws 16, said plate being beveled on its upper edge. A spindle 17 is rigidly secured in the center of said metal plate. The object is to permanently and rigidly secure the spindle to the bottom of the pail 10 and in the center of said pail.

The cream-can 20 is preferably cylindrical and formed of thin sheet metal and has a slightly conical bottom with the upper side convex and the lower side concave. The bottom is centrally perforated, and in the perforations a tube or sleeve 21 is secured. A reinforcing-plate 22 is secured on the under side to the bottom of the cream-can and to the lower end of the sleeve 21. The arrangement is such that when the cream-can is in place the sleeve 21 will rest on the metal plate 15 and hold the cream-can clear of the bottom 10, so that the cream-can may be readily rotated by the knob 23 on the broad metal handle 24, extending laterally from the upper end of the cream-can.

The refrigerating material is placed within the vessel 10 and surrounding the cream-can and is agitated by the substantially A-shaped plate 25, secured to the side of the cream-can at the lower end and directly under the broad handle or plate 24. Said agitator being inclined forces the material upward over it, and to prevent the lumps of ice or the refrigerating material being forced out of the vessel 10 it is placed immediately under the broad plate or handle 24. The outer end of the inclined agitator flares outward and is curved laterally to conform with the surface of the vessel 10, as shown. The lower lateral edges of the agitator are radial, as seen in Fig. 4—that is, in a radial line with the center of the cream-can—and said lower edges are also parallel with the bottom of the pail 10. The agitator 25 extends entirely from the cream-can to the bucket 10, so that it elevates all of the refrigerant material at a point above the agitator, and it cannot escape from the action of the agitator. With this feature the whole body of ice, salt, and water is elevated. This causes a thorough agitation and also mixing of the salt with the water and ice, which is advantageous. Said agitator 25 is also A-shaped, with the two sides thereof extending down into close proximity with the bottom of the outer vessel containing the refrigerant, so that it acts scoop-like in running under all of the refrigerant material, and it diminishes the friction or power necessary to operate the agitator, as there is a space beneath the agitator unoccupied by ice or salt. Hence in whichever direction it may be moved it will operate easily.

The worker for stirring the cream is the concavo-convex vertically-extending plate 26. It is formed of a thin metal plate, with its lower and upper ends turned over to form the arms and reinforcing-laps 27, that extend inwardly or some distance from the plate 26. The bar 28 has the same function as the plate 26 in stirring the cream. It also strengthens or reinforces the arms 27, that are at their inner ends secured to eyes 29 and 30. The lower eye 30 fits over the sleeve 21 and the upper eye 29 fits over the spindle 17 and rests above the sleeve 21. The upper eye 29 has oppositely-placed notches 31 in its upper edge, as seen in Fig. 6, in which the pin 32 rests when said pin is inserted through a hole in the upper end of the spindle 17, said hole being shown in dotted lines in Fig. 1. The notches 31 are sufficiently deep to allow vertical play between the upper eye 29 and the pin 32 to enable the worker to readily move over the bottom of the cream-can. The concavo-convex plate 26 has in addition to the function of stirring the cream that of mashing or smoothing the cream against the side of the cream-can and is so placed as to do this when revolved in either direction. For this purpose said plate and the arms 27 at the upper and lower ends are so made as to hold the middle of the convex surface nearest to the side of the cream-can.

The scraper 33 is a concavo-convex vertically-extending plate with the concave side next to the wall of the cream-can. The scraper is held by the arms 34, that are secured to the convex side of the worker 26 near the top and bottom and are so connected with the plate 33 as to hold the rear edge almost as close to the side of the cream-can as the forward or scraping edge. The rear edge of the scraper is lapped over for its full length to stiffen it and the scraping edge is turned back slightly to conform to the curve of the wall of the can.

The arms 27 of the worker are shaped to conform to the conical bottom of the cream-can and are preferably parallel with each other.

The space between the bar 28 and the worker 26 is sufficient to permit the ready passage through it of the cream, so that the worker will not render the actuation or rotation of the cream-can difficult when the cream has become almost frozen or stiff. The cream-can is provided with the removable lid 35.

While the ice-agitator 25 has been referred to here as A-shaped, it is made preferably, as shown, with an obtuse instead of an acute angle, so that the inclination of the same will not be so great as to prevent the ice from readily passing up and over it. The purpose of it is to pass under the ice and salt and water without to much friction or resistance. I therefore do not wish to limit my invention to any particular angle between the two sides forming said agitator 25.

What is claimed to be the invention, and desired to be secured by Letters Patent, is—

1. An ice-cream freezer including a vessel to contain the refrigerant, a cream-can mounted therein, and a plate secured to said cream-can that is substantially A-shaped with the apex extending upwardly, the outer edges of said plate extending substantially to and conforming with the inner surface of the outer vessel and the lower lateral edges of said plate extending into close proximity to the bottom of said outer vessel and being substantially radial from the center of the cream-can.

2. An ice-cream freezer including a vessel to contain the refrigerant, a cream-can mounted therein, a revoluble means between the lower end of the cream-can and outer vessel with an upwardly-inclined surface for passing under and agitating the refrigerant, and a horizontal plate at the upper end of the ice-cream freezer directly over and revoluble with said agitating means to prevent said agitating means from forcing the refrigerant upward and out of said outer vessel.

3. An ice-cream freezer including a vessel to contain the refrigerant, a cream-can rotatably mounted therein, means secured to the outside of the cream-can with an upwardly-inclined surface for agitating the refrigerant, and a wide handle or plate extending horizontally from the upper end of the cream-can directly over said agitating means.

4. In an ice-cream freezer, a stationary vessel to contain the refrigerant, a spindle secured in the same to the bottom thereof, a cream-can with its bottom concave on the under side and convex on the upper side, a horizontal plate secured to the under side of said bottom for reinforcing the same, and a sleeve extending up centrally through said bottom and plate and secured thereto.

5. In an ice-cream freezer, a stationary vessel to contain the refrigerant, a spindle secured stationary therein, a rotary cream-can having a central sleeve through which said spindle extends, a worker having an eye at the bottom for surrounding said sleeve, and an eye at the top for surrounding the spindle, said upper eye having a pair of vertical notches therein, and a pin through the spindle fitting in said notches, said notches being sufficiently deep to permit vertical play of said worker.

6. In an ice-cream freezer, a cylindrical cream-can, a vertically-extending scraper made concavo-convex with the concave surface next to the side of the cream-can and with the forward edge turned back slightly to be parallel with the side of the cream-can, and the rear edge of the scraper lapped for reinforcing the same.

In witness whereof I have hereunto affixed my signature in the presence of the witnesses herein named.

JOSIAH P. PERKINS.

Witnesses:
V. H. LOCKWOOD,
FLORENCE E. BRYANT.